No. 628,628. Patented July 11, 1899.
R. H. INGERSOLL.
MACHINE FOR DRAWING IN WARP THREADS.
(Application filed Feb. 24, 1899.)
(No Model.) 10 Sheets—Sheet 1.
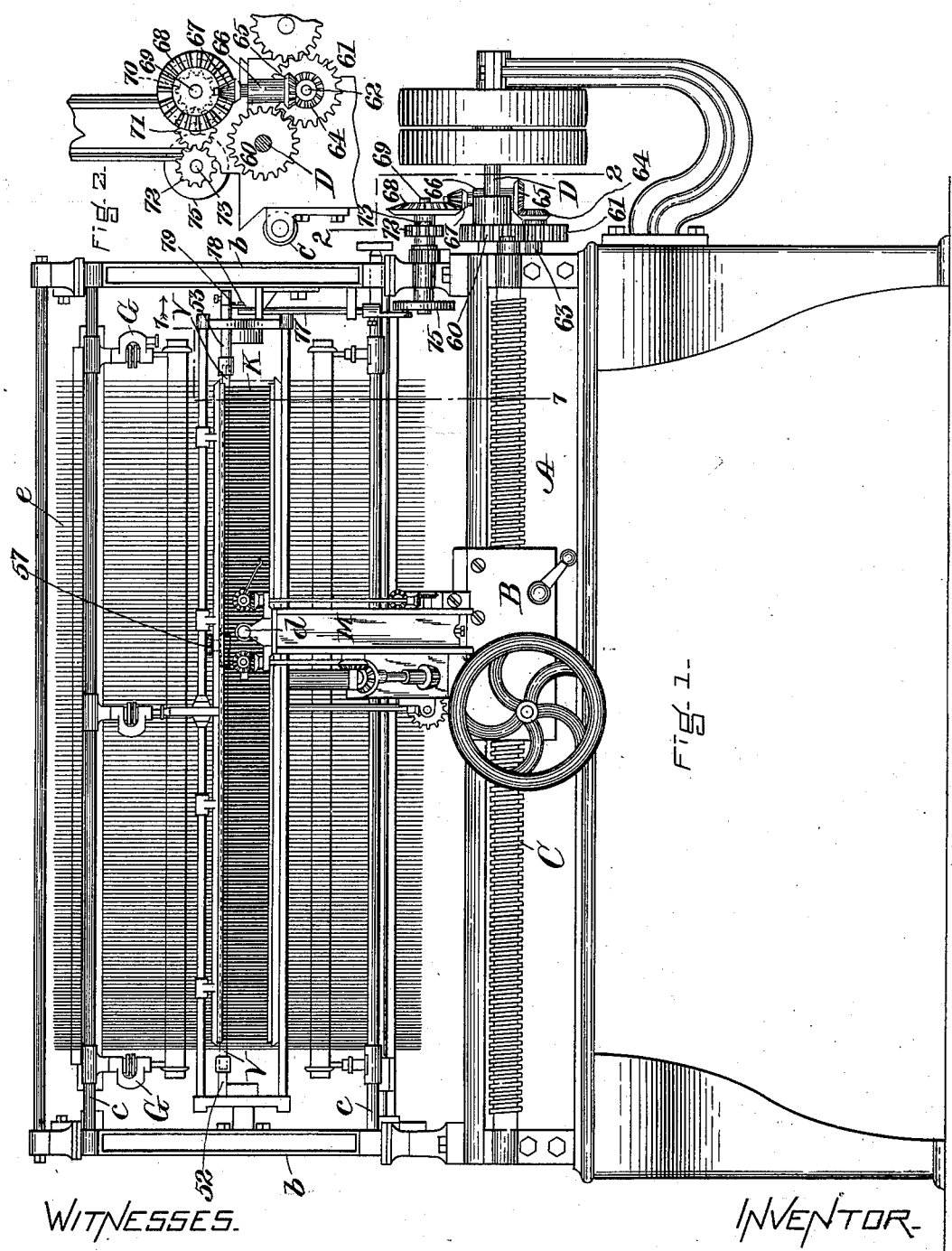
WITNESSES.
A. D. Grover.
Fred E. Dorr.
INVENTOR.
Richmond H. Ingersoll.
by J. E. Teschemacher
Atty.
THE NORRIS PETERS CO., PHOTO-LITHO., WASHINGTON, D. C.

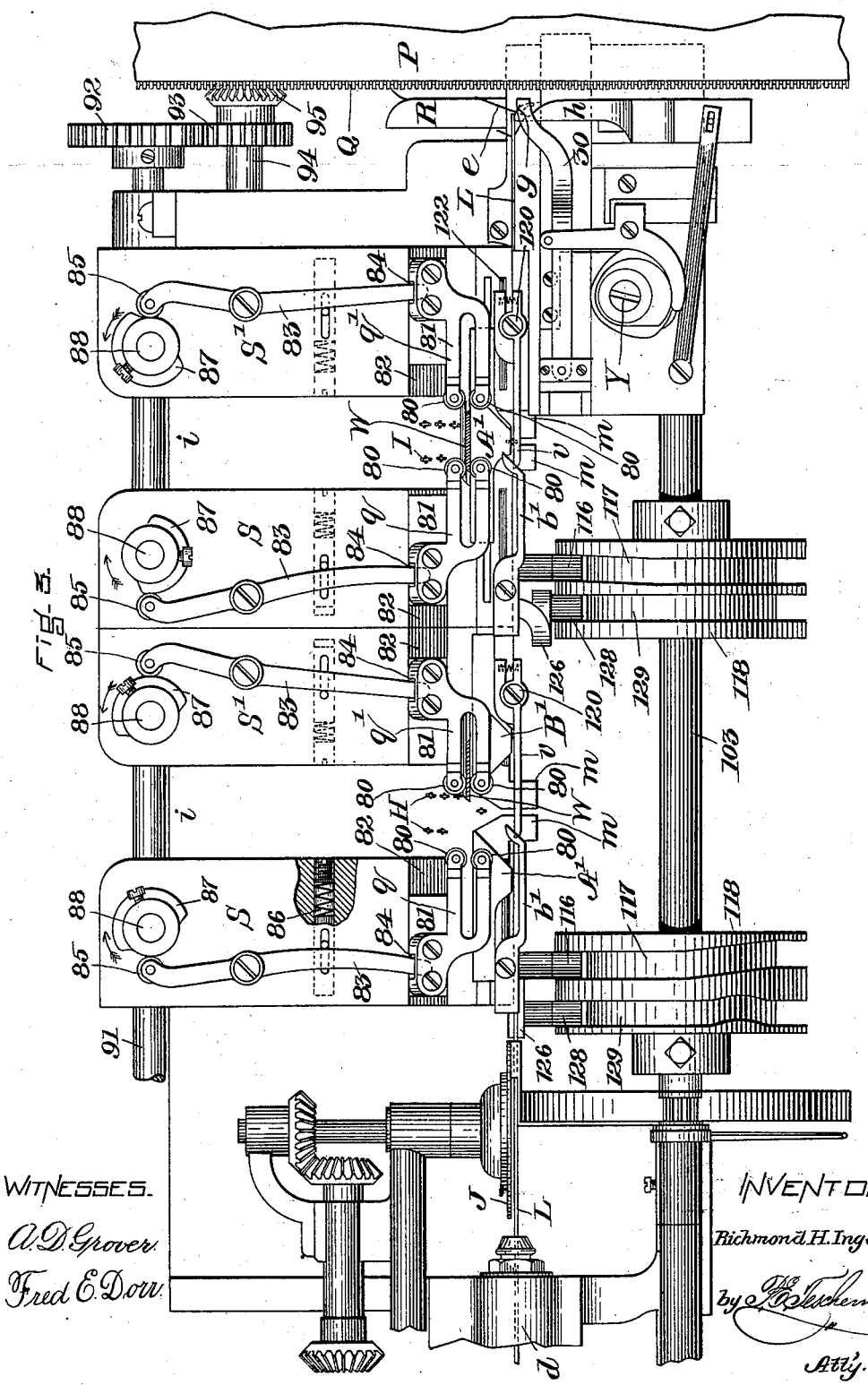

No. 628,628. Patented July 11, 1899.
R. H. INGERSOLL.
MACHINE FOR DRAWING IN WARP THREADS.
(Application filed Feb. 24, 1899.)
(No Model.) 10 Sheets—Sheet 3.
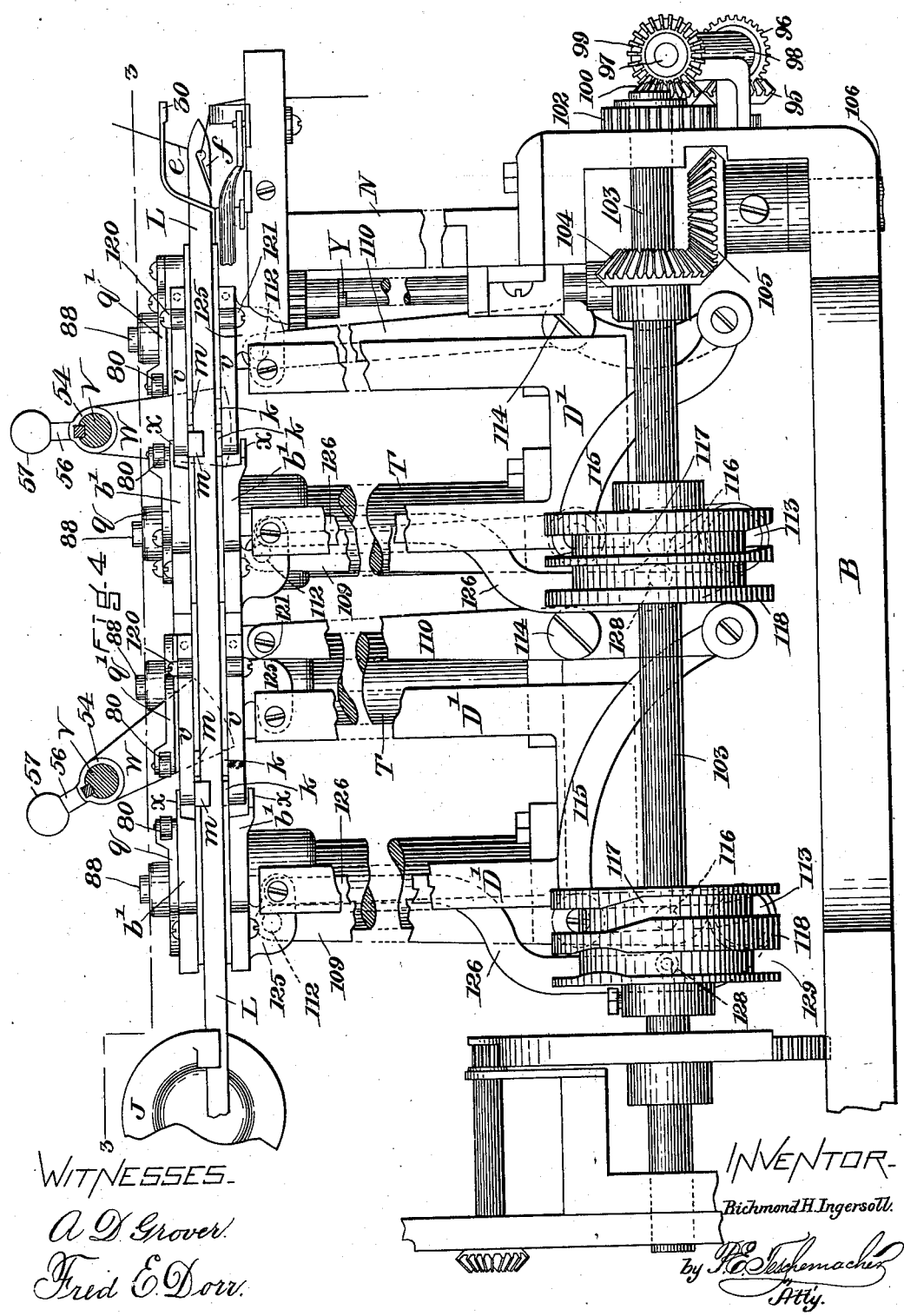
WITNESSES-
A. D. Grover
Fred E. Dorr.
INVENTOR-
Richmond H. Ingersoll.
by H. E. Teichemacher
Atty.

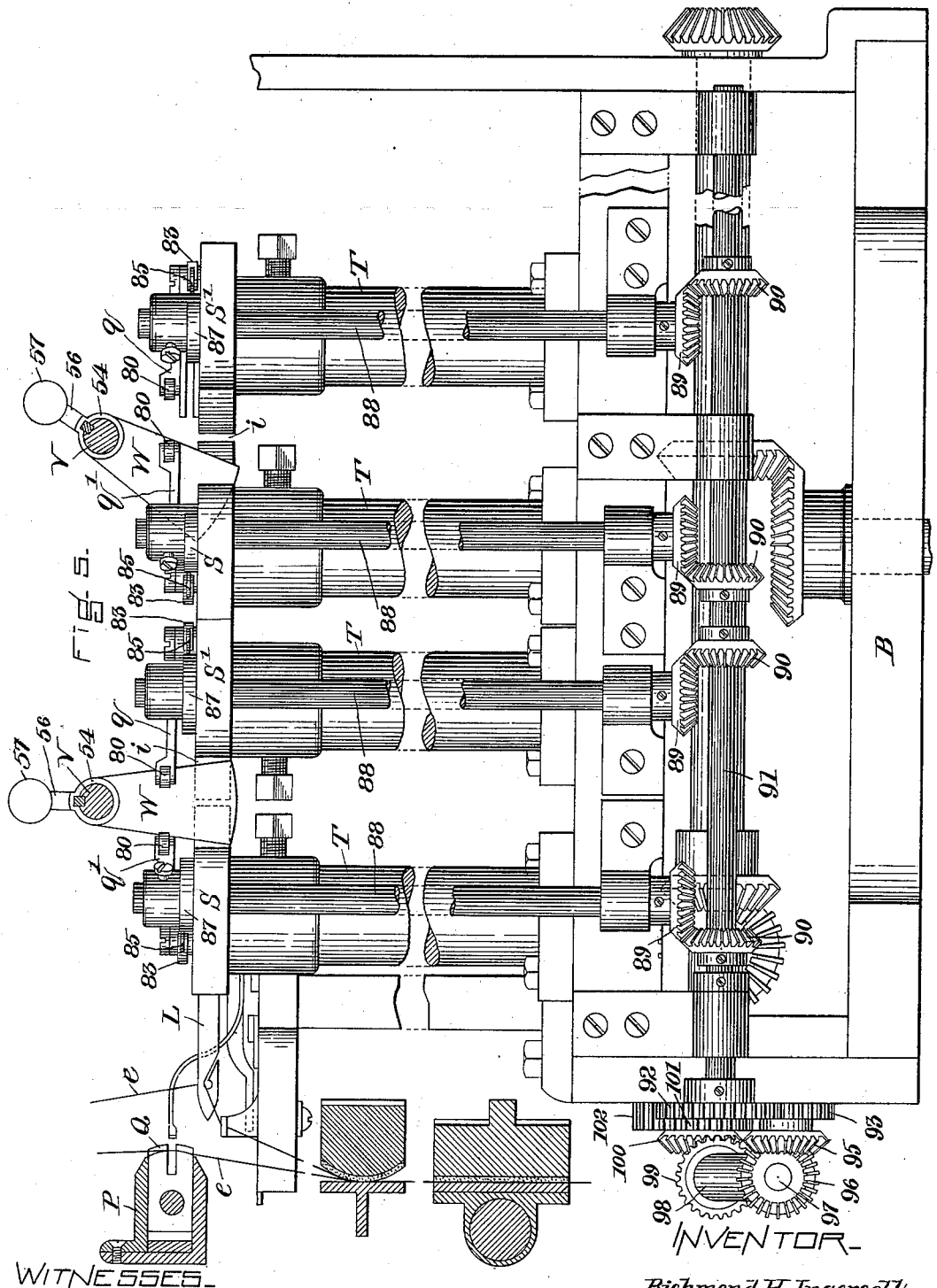

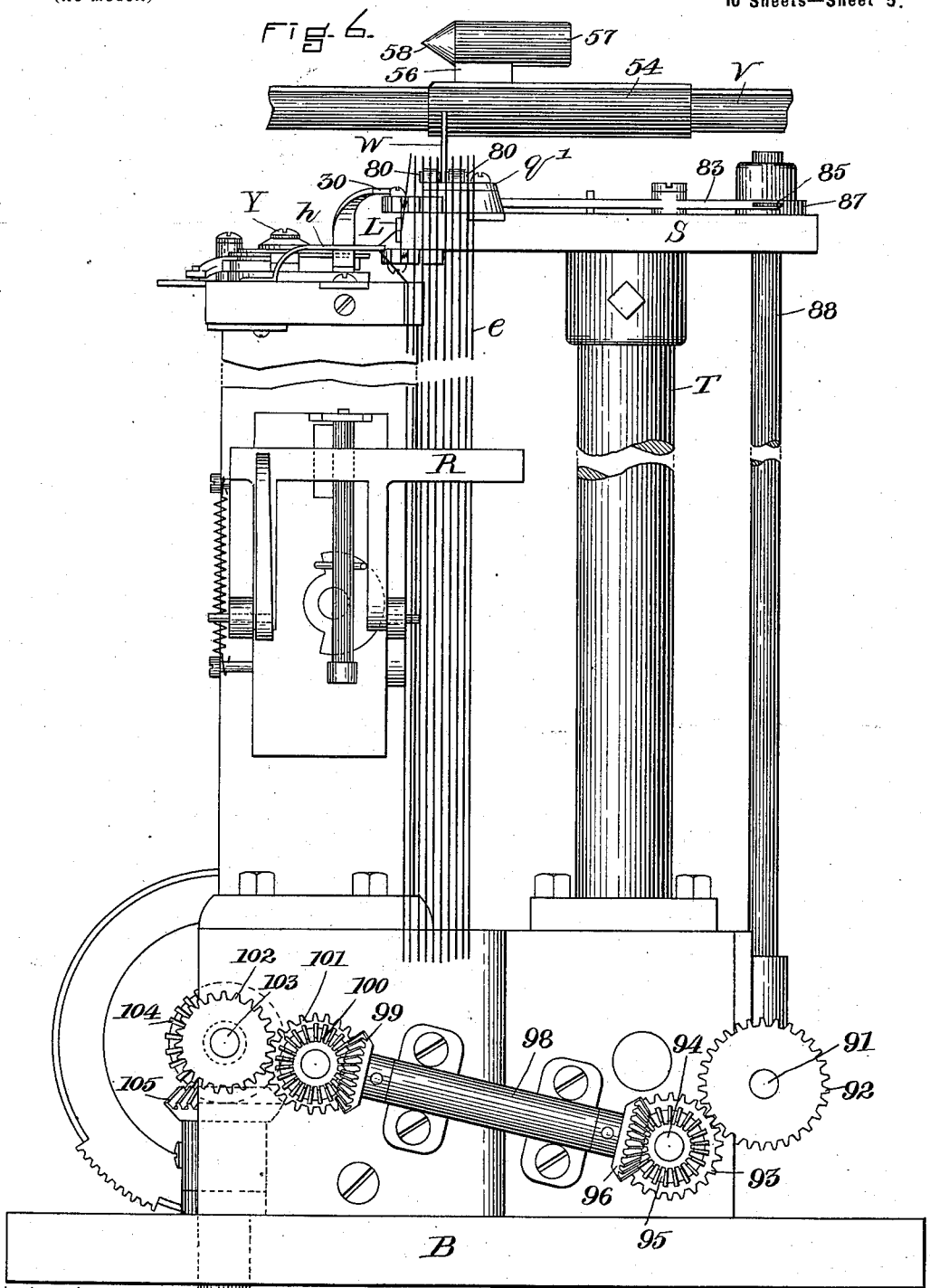

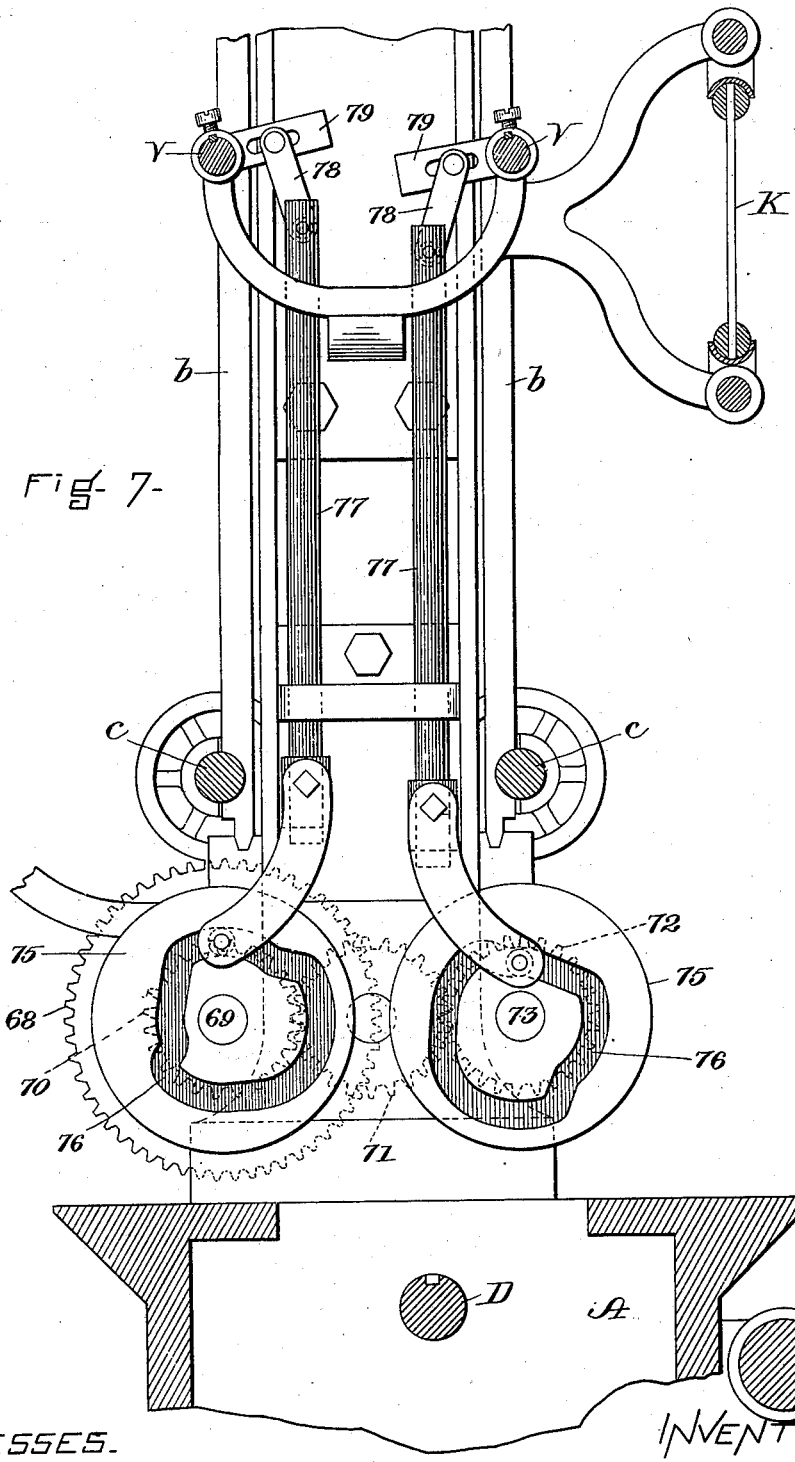

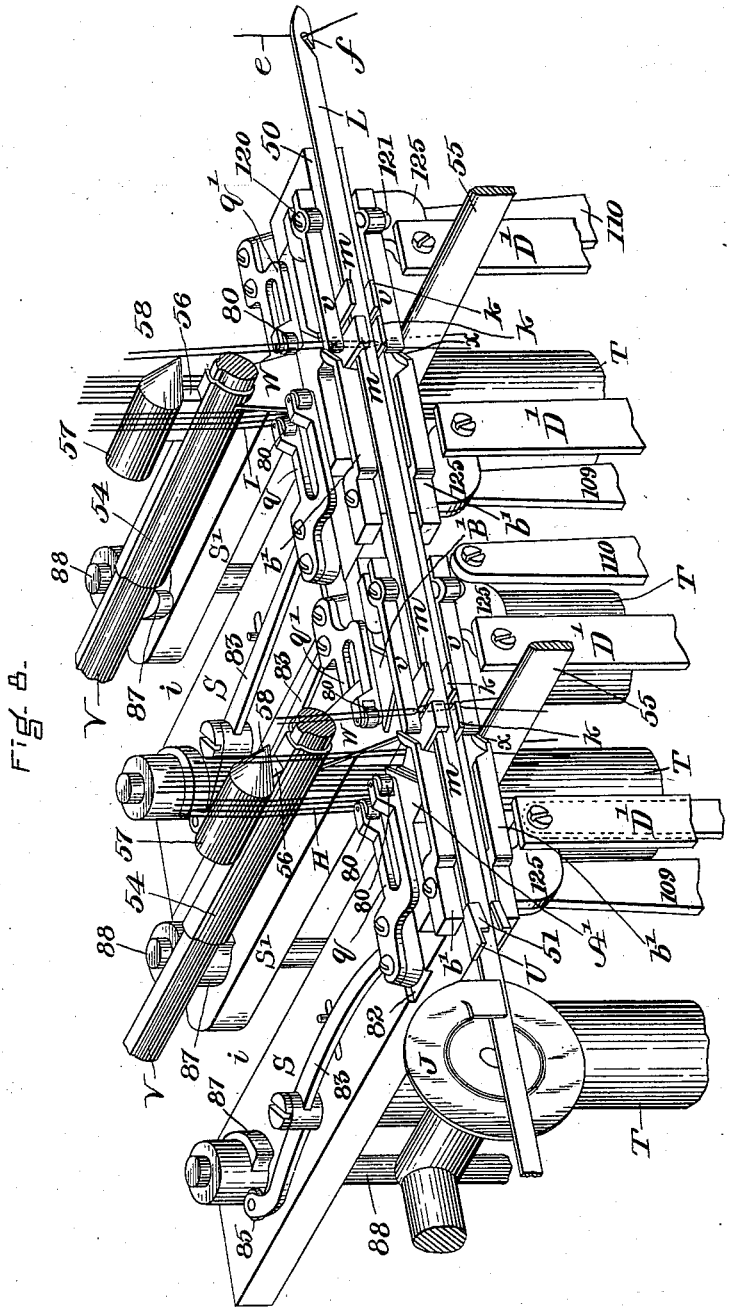

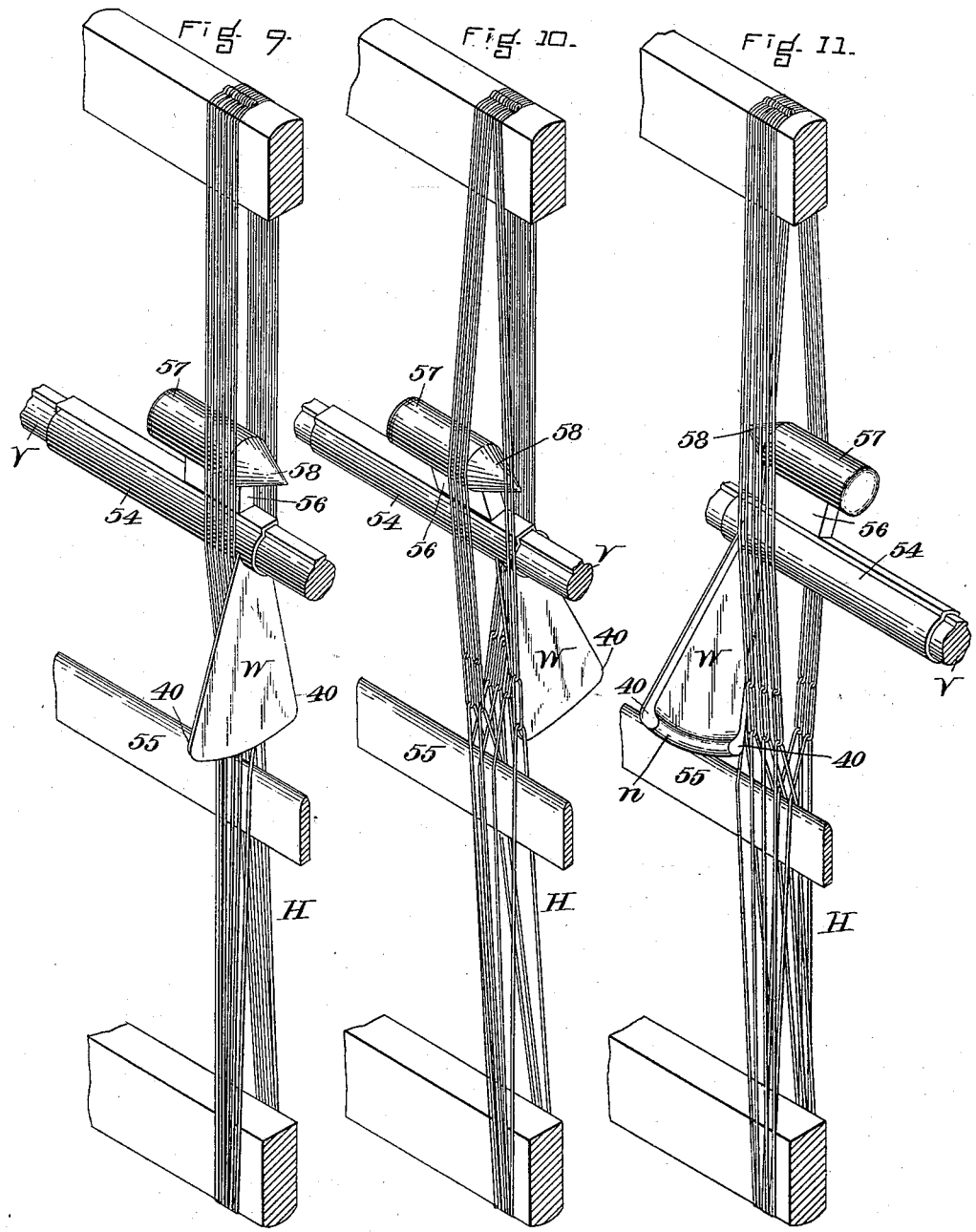

No. 628,628. Patented July 11, 1899.
R. H. INGERSOLL.
MACHINE FOR DRAWING IN WARP THREADS.
(Application filed Feb. 24, 1899.)
(No Model.) 10 Sheets—Sheet 9.

WITNESSES.
A. D. Grover
Fred E Dorr.

INVENTOR-
Richmond H. Ingersoll.
by Teschemacher
Atty.

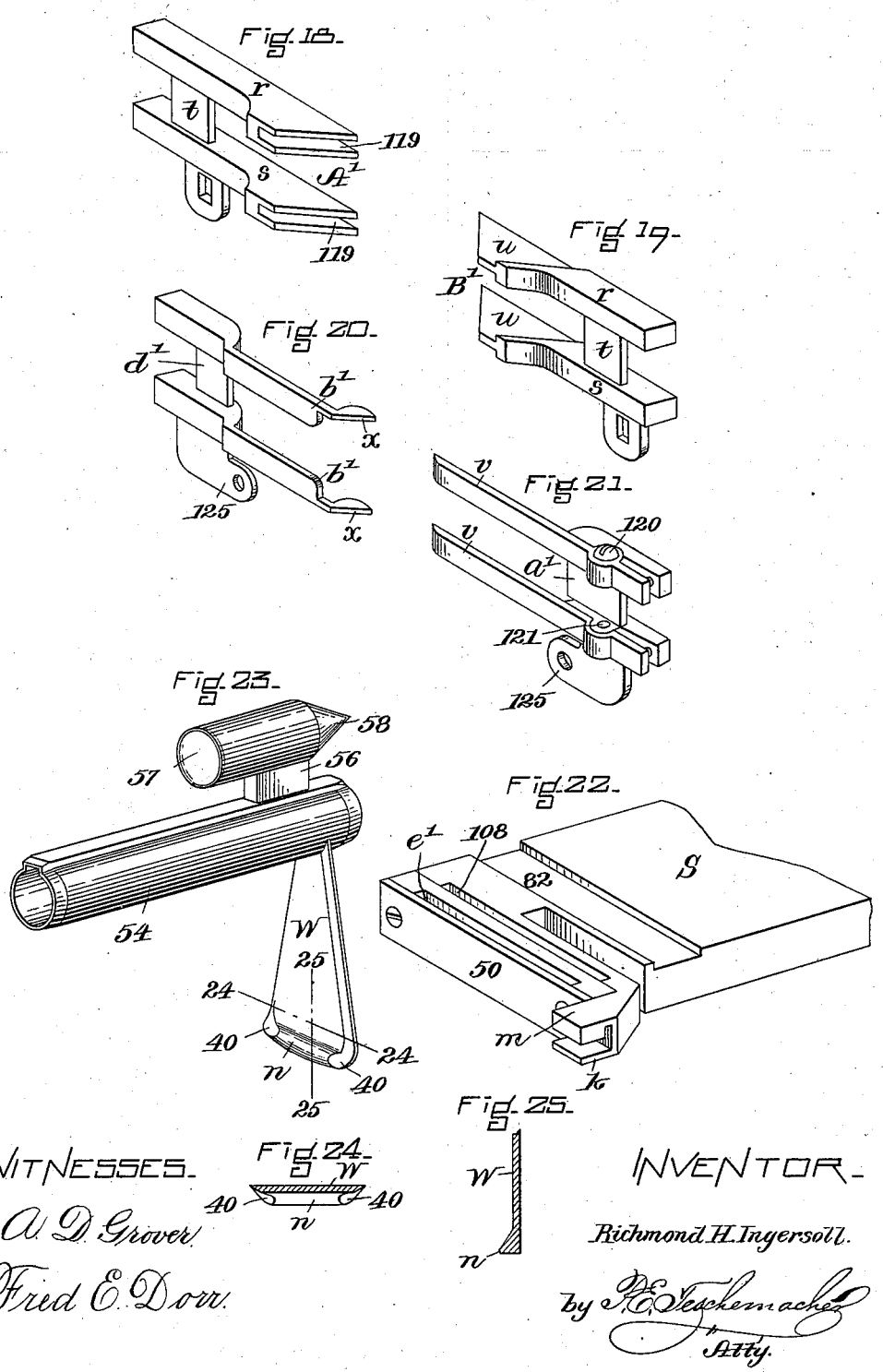

UNITED STATES PATENT OFFICE.

RICHMOND H. INGERSOLL, OF BIDDEFORD, MAINE, ASSIGNOR TO MARCIA M. INGERSOLL, OF SAME PLACE.

MACHINE FOR DRAWING IN WARP-THREADS.

SPECIFICATION forming part of Letters Patent No. 628,628, dated July 11, 1899.

Application filed February 24, 1899. Serial No. 706,724. (No model.)

*To all whom it may concern:*

Be it known that I, RICHMOND H. INGERSOLL, a citizen of the United States, residing at Biddeford, in the county of York and State of Maine, have invented certain Improvements in Machines for Drawing in Warp-Threads, of which the following is a specification.

My invention relates to machines for drawing in warp-threads, and particularly to machines of this character shown in Letters Patent of the United States No. 255,038, dated March 14, 1882; No. 461,613, dated October 20, 1891; No. 468,914, dated February 16, 1892, and No. 590,008, dated September 14, 1897; and my invention consists in certain improvements in the mechanism for separating and holding the heddle-cords with their eyes in the path of the reciprocating needle, whereby it is simplified and rendered more accurate and reliable in its operation; and my invention also consists in certain novel devices and combinations of parts, as hereinafter particularly set forth, and pointed out in the claims.

Figure 12:
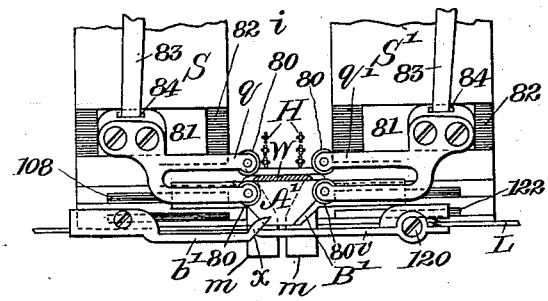
Figure 14:
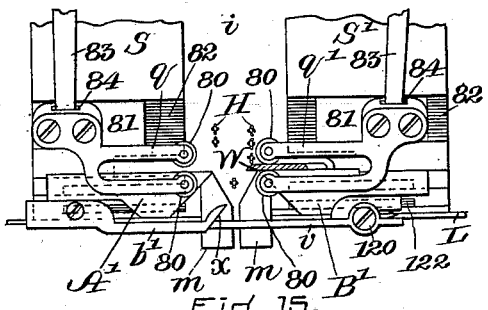
Figure 13:
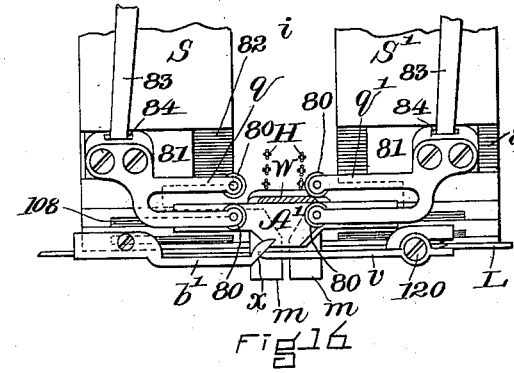
Figure 15:
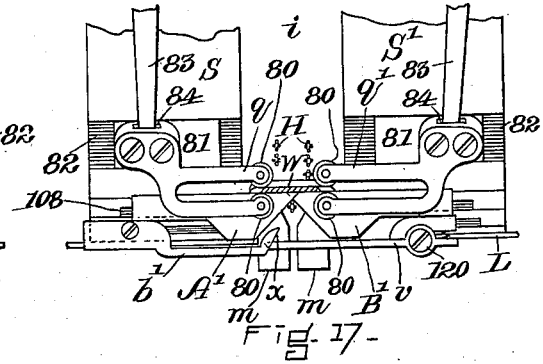
Figure 16:
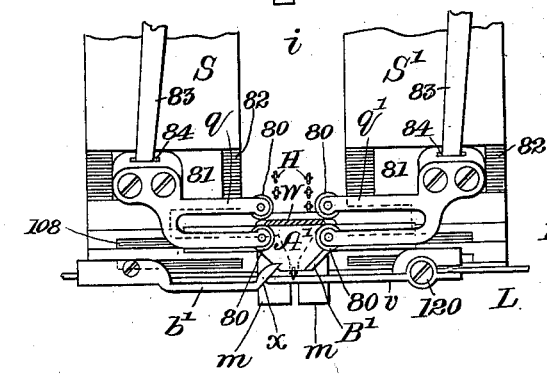
Figure 17:
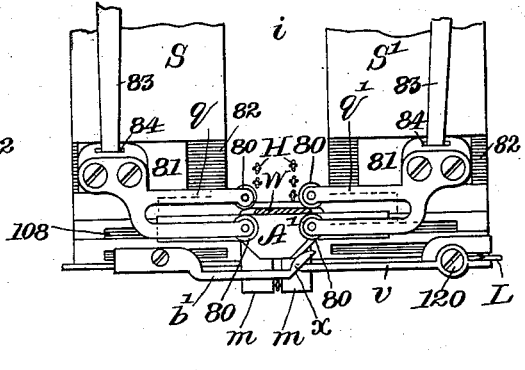

In the accompanying drawings, Figure 1 is a front elevation of a machine for drawing in warp-threads embodying my improvements, some of the warp-threads being shown broken off above the clamp. Fig. 2 is a transverse vertical section on the line 2 2 of Fig. 1. Fig. 3 is an enlarged sectional plan of the heddle-cord-separating mechanism, taken on the line 3 3 of Fig. 4. Fig. 4 is an end elevation of the same, the central portion being broken away. Fig. 5 is a rear elevation of the same. Fig. 6 is a side elevation of the same. Fig. 7 is an enlarged vertical section on the line 7 7 of Fig. 1, looking in the direction of the arrow. Fig. 8 is a perspective view of the heddle-cord-separating mechanism, the supporting-standards and operating-levers being broken away below the platforms. Fig. 9 is a perspective view of the heddle-cord-separating devices, illustrating the manner in which they operate to release the heddle-cords in succession. Fig. 10 is a similar view with the parts in a different position. Fig. 11 is a view of the reverse or opposite side of the parts shown in Fig. 10, said parts being in the same position as in Fig. 10. Fig. 12 is a detail plan of a portion of one of the heddle-cord-separating devices, showing the separating-arm holding back both series of heddle-cords. Fig. 13 is a similar plan showing the heddle-cord-separating devices in the second position. Fig. 14 is a similar plan showing the heddle-cord-separating devices in the third position. Fig. 15 is a similar plan showing the heddle-cord-separating devices in the fourth position. Fig. 16 is a similar plan showing the heddle-cord-separating devices in the fifth position. Fig. 17 is a similar plan showing the heddle-cord-separating devices in the sixth position. Figs. 18 and 19 are perspective views of the wedge-shaped slides which act on the eyes of the heddle-cords to force them outward between the holding-jaws. Figs. 20 and 21 are perspective views of the fingers which finally act upon the heddle-cords to force them out from the separating mechanism. Fig. 22 is a perspective view of the front end of one of the platforms which support the heddle-cord-separating mechanism. Fig. 23 is a perspective view of the separating-arm, its supporting-sleeve, and the cone-shaped spindle on the latter. Fig. 24 is a horizontal section on the line 24 24 of Fig. 23. Fig. 25 is a vertical section on the line 25 25 of Fig. 23.

The framework of the machine may be of any suitable construction and in the present instance consists of a bed A, which is supported on suitable legs and is provided with guides, to which is adapted a traversing carriage or slide B, which is fed from right to left by means of a feed-screw C, driven from the main or driving shaft D of the machine through the medium of suitable gearing and other connections. (Not shown.) The shaft D is provided with the ordinary fast and loose pulleys, as shown in Fig. 1.

Between vertical end pieces or standards *b b* rising from the bed A are secured four horizontal tubular rods *c*, upon which slide the hangers G, which support the heddles H I, the upper and lower bars of which fit within rectangular eyes or yokes at the ends of said hangers. J, Figs. 3, 4, and 8, represents the reed-separating device, and K, Figs. 1 and 7, the reed, which is supported in a suitable frame secured to the standards *b b*, and L is the warp-drawing needle, which is a flat steel bar pointed and barbed at its front end, said needle being reciprocated in a tubular casing d, mounted on a box or casing M, secured to the front of the carriage B and being reciprocated by suitable mechanism, all of the above-described parts being constructed and operating in the manner fully described in my aforesaid Letters Patent No. 461,613.

The mechanism by which the warp-threads e are successively selected and carried one at a time against the barbed needle L into a position to insure their being caught by its hook f as the needle is retracted, so as to be drawn thereby through the eye of the heddle and between the dents of the reed, is shown at the right-hand end of Figs. 3 and 4.

N is a standard which is bolted to the carriage B, Fig. 4, upon which is mounted a swinging curved arm 30, carrying at its outer end the selecting-hook g, by means of which the warp-threads are successively presented to the reciprocating warp-drawing needle L in a manner to insure each one being caught thereby in its turn.

P represents a long bar having beveled edges, against which the warp-threads are tightly pressed when stretched between the upper and lower clamping devices of the warp-holding frame, (not shown,) and Q is the thread-separating comb, having shallow vertical grooves for receiving the warp-threads. A hook h coöperates with the selecting-hook g, and both of these hooks are operated by suitable cams on a vertical shaft Y. This thread-selecting mechanism is substantially the same as that shown, described, and claimed in my aforesaid Letters Patent No. 590,008, and as it forms no part of my present invention will not be herein further referred to.

R, Figs. 3 and 6, represents the horizontal vertically-reciprocating nippers which operate to take up the slack in the warp-threads as they are presented to the selecting mechanism. These nippers are substantially similar in construction and mode of operation to those shown and described in my aforesaid patents, Nos. 461,613 and 468,914, and as they form no part of my present invention they will not be herein further described.

The mechanism for separating the heddle-cords and holding them with their eyes in the path of the reciprocating needle L in such manner that the passage of the latter through the heddle-eyes will be insured will now be described, said mechanism forming the subject of my present invention and being shown particularly in Figs. 3 to 25, inclusive. The operation to be effected is the same as in the machine described in my Patent No. 461,613, before referred to—that is to say, the needle passes first through the reed K, then through an eye of the heddle H, then between two eyes of the heddle I, Fig. 8, and after receiving a warp-thread e draws it between two eyes of the heddle I, through an eye of the heddle H, and through the reed; but on the next stroke the needle passes between two eyes of the heddle H and through an eye of the heddle I and receiving another warp-thread e draws it through an eye of the heddle I, between two eyes of the heddle H, through the reed, and so on until all of the warp-threads have been drawn through the heddle-eyes and the reed.

The number of threads which pass through each space between the dents of the reed corresponds to the number of heddles being threaded in the machine.

The eyes of each heddle are selected and separated one by one in proper order and held in position for the passage of the hooked needle L in the following manner, and as the eye-separating mechanism for the heddle H is precisely like that for the heddle I, the two mechanisms being so connected with the power that the heddles are acted upon alternately, I will describe only the device for acting on one heddle, which will apply equally to the device for acting on the other heddle.

S S' are two plates or platforms, which are supported on posts or standards T rising from the carriage B, and between these two platforms is a space or channel i, through which the heddle-cords pass as the carriage B, with the platforms S S', is traversed from one end of the machine to the other, this space being narrowed down toward the rear end, as seen in Figs. 3, 14, and 15, to a width just sufficient to allow the passage of one of the eyes of the heddle-cords when said eye is turned edgewise, so as to face toward the front of the machine.

At the rear end of each of the platforms S S' are two small projecting plates k m, forming jaws flush, respectively, with its lower and upper surfaces, the space between the upper and lower jaws being just sufficient to hold a heddle-eye with its upper and lower knots fitting close up under the lower plates k and down upon the upper plates m, as shown in Fig. 8, the distance between the two jaws of a pair being sufficient to allow the passage of a heddle-eye turned edgewise, so as to present a single thickness of the cord only, and with its face presented toward the front of the machine and directly in the path of the reciprocating needle L, which as it advances is held closely up against the vertical end faces 50 of the platforms S S'.

At the corner of the platform S which is close to the front of the machine is placed a guide U, Fig. 8, through which the needle L passes, said guide being provided with a downwardly-extending and inwardly-inclined flange 51, which serves to catch the point of the needle in case it should have become accidentally sprung outward and carry it snugly against the end face of the platform.

The heddles are constructed in the usual manner, as shown in Figs. 9, 10, and 11, and between the cords of each heddle, above the eyes, passes a rock-shaft V, which is supported at its opposite ends in bearings 52 53, Fig. 1, on the framework.

W, Figs. 9, 10, and 11, is an oscillating separating-arm which is secured to a sleeve 54, arranged by means of a feather and groove to slide on, but rock with, the shaft V and to be traversed longitudinally thereon in unison with the carriage B, by means of carriers on the platforms S S', in a manner to be hereinafter described. At the bottom of the separating-arm W, on the inner side, is a rounded lip or flange $n$, the opposite ends of which are tapered or inclined to meet the thin edge of the arm W, thus forming wedges 40, the purpose of which will be presently explained.

A flattened thin-edged bar 55 is, as usual, introduced longitudinally between the cords of the heddles and is suspended in any suitable manner — for instance, by means of wires — at such a height as to bring it directly under the eyes of the heddle at a short distance therefrom, which will cause the face of each eye to be presented toward the front of the machine. From the upper side of the sleeve 54 projects an arm 56, carrying at its upper end a short horizontal rod or spindle 57 parallel with the shaft V and cone-shaped at one end, as shown at 58. The function of this oscillating arm W and the cone-pointed rod 57, which coöperates therewith, is to separate the heddle-cords and select eye after eye in succession to be subsequently presented to the needle by mechanism to be hereinafter described. As the shaft V is rocked and the arm W and rod 57 swung or vibrated first to one side and then to the other the cone-shaped end 58 puts a tension on the heddle-cords lying in its path by its pressure thereon, as shown in Fig. 10, causing the cords of the eye in advance on the side opposite to the direction of movement of the separating-arm to slide down to the point or end of the cone, thus separating them from those in the rear, as shown in Fig. 10, and as the separating-arm W reaches the limit of its vibration in that direction the thin end or point of the wedge-shaped end 40 of the lip $n$ on that side rests against the knot or lower end of the eye of the next heddle on the opposite side, as shown particularly in Fig. 11, thus holding back all the heddles on that side. Now as soon as the arm W commences to swing back in the opposite direction the said wedge-shaped end 40, acting against the knot or lower end of the contiguous heddle-eye, presses or wedges it back, thus still further forcing back all of the heddle-cords on that side and insuring a sufficient separation between the heddle-cords of the eye last released and those of the eye next to come forward to render it certain that the separating-arm will pass between them. This lip $n$, with its wedge-shaped ends, thus renders the action of the separating-arm W absolutely perfect, as it prevents any possibility of its failing to pass properly between and separate the heddle-cords, and I therefore regard it as a very important feature of my invention.

I will now describe the connections between the driving-shaft and the two shafts V, whereby the latter are rocked to operate the two separating-arms W. To the driving-shaft D is secured a gear 60, Figs. 1 and 2, which meshes with a gear 61 on a short shaft 62, supported on a stud 63 and carrying a bevel-gear 64, meshing with a bevel-gear 65 on a short vertical shaft supported in a bearing 66 and carrying at its upper end a bevel-pinion 67, meshing with a bevel-gear 68 on a short horizontal shaft 69, supported in a bearing in the framework and carrying a gear 70, which meshes with an intermediate gear 71, the latter meshing with a gear 72 on a short shaft 73, supported in bearings in the framework. The shafts 69 73 each carry a cam-wheel 75, Figs. 1 and 7, within the groove 76 of which fits a cam-roll at the end of a vertical rod 77, which slides in suitable bearings projecting from the framework. To the upper end of each of the sliding rods 77 is pivoted a link 78, the upper end of which is connected by a pin and slot with an arm 79, secured to an extension of the rock-shaft V, which is thus rocked at the proper times by the revolution of its cam-wheel 75.

The mechanism by which the oscillating separating-arm W is traversed along its shaft V in unison with the carriage B will now be described.

$q\ q'$ are two bifurcated carriers, each branch of which is provided at its outer end with an antifriction-roll 80, the two branches or arms of each carrier of a pair receiving between them the separating-arm W as it is swung over to one side or the other, said separating-arm being always between the branches of one or the other of the two carriers when swung to one side or between the branches of both carriers when in its central position, one of the arms W being shown in the latter position at the right-hand end of Fig. 3. The carriers are each secured to a slide 81, moving in a groove or way 82 in the table S or S', and hence the separating-arms W must traverse on their rock-shafts V with the tables S S', which latter are mounted on the carriage B, as previously described.

Each of the slides 81 is reciprocated to withdraw its carrier entirely out of the way of the line of heddle-cords on that side by means of a lever 83, which enters an aperture 84 in the carrier, said lever being provided at its opposite end with a cam-roll 85 and being actuated against the resistance of a spring 86 by a cam 87, fast on the upper end of a vertical shaft 88, at the lower end of which is a bevel-gear 89, Fig. 5, which meshes with a bevel-gear 90 on a horizontal shaft 91, carrying at one end a gear 92, which meshes with a gear 93, rotating on a stud 94, Fig. 6, and having fastened to it a bevel-gear 95, which meshes with a bevel-gear 96 on the end of an inclined shaft 97, Figs. 4 and 5, supported in a long bearing 98 and carrying at its opposite end a bevel-gear 99, meshing with a bevel-gear 100, rotating on a stud and having fastened to it a gear 101, meshing with a gear 102 on a long horizontal shaft 103, Figs. 3, 4, and 6, which carries a bevel-gear 104, meshing with and driven by a bevel-gear 105 on the upper end of a short vertical shaft 106, which receives motion from the driving-shaft of the machine through intermediate connections. (Not shown.)

A' B', Figs. 18 and 19, are a pair of double wedge-shaped slides, which are guided in slots 108, Fig. 22, in the platforms S S' and are reciprocated simultaneously in opposite directions by means of levers 109 110, connected thereto at 112, as shown in Fig. 4. These levers 109 110, which are fulcrumed, respectively, at 113 114, are coupled together by a curved connecting-rod 115, Fig. 4, and the lever 109 is provided with a cam-roll 116, which fits within a cam-groove 117 in the face of a cam-wheel 118, fast on the shaft 103, which receives its motion from the driving-shaft, as previously described. Each of the slides A' B' is composed of two members $r\ s$, spaced apart by means of a block or piece $t$, to which they are attached, said block $t$ fitting within the slot 108, and the slide having pivoted to its lower end the upper end of its operating-lever.

One side or face of each member of the slides A' B' is beveled or inclined, and the upper and lower inclined portions of the slide A' are each mortised out, as shown at 119, to receive corresponding tongues $u$, forming the upper and lower inclined portions of the slide B', whereby as the two slides are closed together the heddle-cords will be caught between them and resting against their inclined sides will be forced outward to carry the heddle-eye between the jaws $k\ m$ and the heddle-cords of said eye against the inner sides of a pair of spring-pressed fingers $v\ v$ to firmly hold the eye in the path of the needle L, as shown in Fig. 16, and at the right-hand end of Fig. 3, said fingers $v$ being pivoted at 120 121 to a slide $a'$, Fig. 21, fitting within a slot 122, Figs. 3 and 12, in the platform S'. The free ends of the two fingers $v$ extend under and slightly beyond the inwardly-inclined ends $x$ of two unyielding fingers $b'\ b'$, secured to a slide $d'$ fitting within a slot $e'$ in the platform S', as shown in Fig. 22. The slides $a'$ and $d'$ are coupled together, so as to move simultaneously in the same direction by a U-shaped yoke D', the upper ends of which are secured to lugs 125 projecting down from the said slides, and to the lug of the slide $a'$ is pivoted a lever 126, fulcrumed at 113, and carrying a cam-roll 128, which fits within a cam-groove 129 in the face of the cam-wheel 118 on the shaft 103, whereby the required reciprocation is given to the two pairs of fingers $v\ b'$, and consequently with the parts in the position shown in Fig. 16 as the fingers $v\ b'$ are moved from left to right after the heddle-eye has been threaded the beveled or inclined ends $x$ of the fingers $b'$ will catch the heddle-cords of this eye and force them outward, the fingers $v$ yielding against the resistance of their light springs to permit the cords to pass out between the ends of the two pairs of fingers into the position shown in Fig. 17.

The operation of the above-described mechanism is as follows: The parts being in the position shown in Figs. 9 and 12, which show the heddle-cords of the heddle H in the first position and the line of heddle-cords being held back out of the way by the separating-arm W, the carrier $q$ is drawn back into the position shown in Fig. 13, which I term the "second" position, so that the antifriction-rolls at the ends of its two arms will be entirely out of the way of the line of heddle-cords on the left-hand side. The separating-arm W is now swung over to the right between the branches of the carrier $q'$ into the third position, (shown in Fig. 14,) the separating-arm W being also shown in the third position in Fig. 10, just previous to which the slides A' B' separate to allow of the passage between them of the heddle-cords of the eye just released. This movement of the separating-arm W releases the cords of the foremost heddle-eye on the left side, as shown in Fig. 14, the cone-shaped end of the rod 57 at the same time putting a tension on the cords of said heddle-eye, as shown in Fig. 10, and causing them to instantly separate from those of the heddle-eyes in the rear, when they will pass out beyond the points of the wedge-shaped slides A' B', which now close together, causing the tongues $u$ to enter the mortises 119, as shown in Fig. 15, which I term the "fourth" position, when the coöperating inclined or beveled sides of said slides, acting on the heddle-cords above and below the heddle-eye, will force or wedge the same outward into the fifth position, (shown in Fig. 16,) and during these movements the carrier $q$ and the separating-arm W return to their original first positions, as shown in Fig. 12. The heddle-eye is now squarely between the jaws $k\ m$, in which position it is firmly held by the two fingers $v\ v$, which press the heddle-cords of said eye against the opposite edges of the slides A' B'. The needle L now passes through the heddle-eye, receives a warp-thread, and draws it back through said eye, immediately after which the two pairs of fingers $v\ b'$ move to the right, when the inclined ends $x$ of the fingers $b'$ will contact with the heddle-cords and passing behind or on the inner side of the same force the heddle-eye outward and beyond the path of the needle L into the sixth or last position, (shown in Fig. 17,) the fingers $v$ yielding during this movement to permit the cords of the threaded eye to pass freely out from between the ends of the opposite pairs of fingers, after which the heddle-eye will pass entirely out of the jaws $k\ m$ as the platforms S S' are moved along with the traversing carriage B. The carrier $q'$ in its turn is drawn back out of the way of the row of heddle-cords on the right-hand side of the heddle H and the separating-arm W swung over to the left between the branches of the carrier q to release the cords of the foremost heddle-eye on the right-hand side, and the operation of the parts is then repeated, the slides A' B' and fingers v b' acting on the heddle-cords of this eye in the same manner as on the one last described. When the machine is arranged for threading two heddles, as in the present instance, the eyes of the rear heddle are all held out of the path of the needle while a single eye of the front heddle is being threaded and the eyes of the front heddle are then held out of the way while an eye of the rear heddle is being threaded, these alternate actions being continued until all of the eyes of both heddles have been threaded. As soon as an eye of the front row or series of cords of the heddle H has been carried into position between the jaws k m and while the needle is passing through said eye the front row or series of cords of the other heddle I is released by the movement of its separating-finger W, and the cords of the foremost eye of this series are permitted to pass forward into the narrow portion of the channel i, and by the time that the eye of the heddle H has been threaded and pushed outward by the fingers v b' the eye of the heddle I has arrived into the proper position between the jaws k m of its separating device for the passage of the needle therethrough, and while an eye of the heddle I is being threaded the separating-arm W of the heddle H remains stationary in its central position, as shown in Fig. 9, to hold back both series of cords, and as soon as the thread has been drawn through the eye of the heddle I and said eye has been pushed outward by its fingers v b', and while the needle is being drawn back to carry said thread through the reed, the separating-arm W of the heddle H releases the back series of cords of said heddle, the cords of the foremost eye of which are then carried forward, as previously described, and while this is taking place the separating-arm W of the heddle I remains stationary and holds back both series of cords of said heddle I, and in this manner the two separating devices operate alternately, a front eye of the heddle H being first acted on and threaded, then a front eye of the heddle I, then a back eye of the heddle H, and finally a back eye of the heddle I, these operations being repeated until the eyes of all of the cords have been threaded.

The reed-dent separator J is driven from the shaft 103 by means of suitable connections (not shown) and operates in the same manner as described in my aforesaid Patent No. 461,613, said separator making a single revolution immediately after the needle has drawn the required number of warp-threads through a single space between the dents of the reed.

What I claim as my invention, and desire to secure by Letters Patent, is—

1. In a machine for drawing in warp-threads, the combination with a heddle-supporting device and a rock-shaft extending longitudinally between the cords of the heddle, of a spindle or projection sliding on, but vibrating with said rock-shaft, and having a conical or pointed end adapted when said spindle or projection is vibrated, to produce a tension on the heddle-cords, whereby the cords of the foremost heddle-eye are caused to slide to the end of the point of said spindle or projection, and be thereby separated from the cords in the rear, substantially as described.

2. In a machine for drawing in warp-threads, the combination with a heddle-supporting device and a rock-shaft extending longitudinally between the cords of the heddle, of a sleeve sliding on, but rocking with said shaft, a spindle or projection mounted on said sleeve, and having a conical or tapering front end, and adapted when said shaft is rocked, to produce a tension on the heddle-cords, whereby the cords of the foremost heddle-eye are caused to slide to the end of the point of said spindle or projection, and be thereby separated from the cords in the rear, substantially as described.

3. In a machine for drawing in warp-threads, the combination with a heddle-supporting device, of an oscillating and traversing separating-arm provided with a spindle or projection having a conical or pointed end, and adapted when said arm is oscillated, to produce a tension on the heddle-cords on the side opposite to the direction of movement of said arm, whereby the cords of the foremost heddle-eye are caused to slide to the end of the point of said spindle or projection, and be thereby separated from the cords in the rear, substantially as described.

4. In a machine for drawing in warp-threads, the combination with a heddle-supporting device and a rock-shaft extending longitudinally between the cords of the heddle, of an oscillating and traversing heddle-cord-separating arm provided with a sleeve sliding on, but rocking with said shaft, a spindle or projection mounted on said sleeve, and having a conical or tapering front end, and adapted when the separating-arm is oscillated, to produce a tension on the heddle-cords on the side opposite to the direction of movement of said arm, whereby the cords of the foremost heddle-eye are caused to slide to the end of the point of the spindle or projection, and be thereby separated from the cords in the rear, substantially as described.

5. In a machine for drawing in warp-threads, the combination with a heddle-supporting device, of a rock-shaft extending longitudinally between the cords of the heddle, an oscillating and traversing heddle-cord-separating arm sliding on, but vibrating with said shaft, and being provided on the opposite side of the same with a spindle or projection parallel with said shaft, and having a conical or tapering front end, and adapted when said arm is oscillated, to produce a tension on the heddle-cords with which it contacts, whereby the cords of the foremost heddle-eye are caused to slide down to the end of the point of the spindle or projection, and be thereby separated from the cords in the rear, and means for actuating the rock-shaft and traversing the separating-arm and pointed spindle or projection thereon, substantially as described.

6. In a machine for drawing in warp-threads, a traversing and oscillating heddle-eye-separating arm provided on the inner side of its lower edge with a lip or flange tapered or inclined at each end to form a wedge adapted to act on and force back the line of heddle-cords in the rear of the same at the commencement of each vibration of the separating-arm, substantially as described.

7. A heddle-eye-separating device consisting of an oscillating and traversing flattened arm provided on the inner side of its lower edge with a lip or flange tapered or inclined at each end to form a wedge adapted to force back the line of heddle-cords in the rear of the same, said oscillating arm being provided with a spindle or projection having a tapering or cone-shaped end, and adapted when said arm is oscillated, to produce a tension on the heddle-cords, whereby the cords of the foremost heddle-eye are caused to slide to the end of the point of said spindle or projection, and be thereby separated from the cords in the rear, substantially as described.

8. In a machine for drawing in warp-threads, the combination with an oscillating and traversing heddle-eye-separating arm, of a pair of bifurcated reciprocating carriers adapted to receive said arm between their branches as it is vibrated from side to side, and means for alternately reciprocating said carriers to withdraw them out of the way of the line of heddle-cords, substantially as described.

9. In a machine for drawing in warp-threads, the combination with a heddle-eye-separating arm, and means for supporting, oscillating and traversing the same, of a pair of bifurcated reciprocating carriers for receiving and traversing said separating-arm, said carriers being provided at the outer ends of their branches with antifriction-rolls between which the said separating-arm passes as it is vibrated from side to side, and means for alternately reciprocating said carriers to withdraw them out of the way of the heddle-cords, substantially as described.

10. In a machine for drawing in warp-threads, the combination of a heddle-supporting device, a traversing carriage, platforms supported by and moving with said carriage, and having a space or channel between them, a pair of eye-holding jaws at the end of said channel, an oscillating traversing heddle-eye-separating arm, a rock-shaft for supporting the same, a pair of reciprocating bifurcated carriers arranged on opposite sides of said channel, and adapted to receive said separating-arm and traverse the same on its supporting-shaft, said carriers being alternately drawn back out of the way of the adjacent line of heddle-cords, and means for reciprocating the carriers, substantially as described.

11. In a machine for drawing in warp-threads, the combination with the traversing carriage, the reciprocating warp-drawing needle and the platforms mounted on the said carriage, and having a space or channel between them, and the eye-holding jaws at the end of said channel, of the oscillating heddle-cord-separating arm, the reciprocating carriers for receiving said arm and traversing the same, means for alternately withdrawing said carriers out of the way of the heddle-cords, the wedge-shaped slides moving simultaneously in opposite directions, and adapted when closing together, to engage the heddle-eye between them, and force it outward into the path of the needle, and the oppositely-arranged pairs of fingers for holding the heddle-eye against the outer edges of the wedge-shaped slides and in the path of the needle while being threaded, and subsequently forcing said eye out of the path of the needle, and holding it at the ends of the jaws while the wedge-shaped slides are being drawn back, and means for actuating said slides and fingers, substantially as described.

12. In a machine for drawing in warp-threads, the combination of the oscillating and traversing heddle-eye-separating arm and its bifurcated reciprocating carriers, the reciprocating wedge-shaped slides adapted when closing together, to engage the heddle-eye between them, and carry it outward into the path of the needle, and the two oppositely-arranged pairs of reciprocating fingers coupled together to move simultaneously in the same direction, one pair of said fingers operating to hold the heddle-eye against the wedge-shaped slides while the needle is passing through said eye, and the opposite pair of fingers having inwardly-inclined pointed ends adapted to pass behind the heddle-eye, and force the same to the outer ends of the eye-holding jaws, and hold it in position during the withdrawal of the wedge-shaped slides, substantially as described.

13. In a machine for drawing in warp-threads, the combination with the platforms having a space or channel between them and eye-holding jaws at the end of said channel, and the reciprocating wedge-shaped slides arranged on opposite sides of said channel, and adapted when closing together, to engage the heddle-eye between them and carry it outward into the path of the needle, of the two oppositely-arranged pairs of reciprocating fingers coupled together to move simultaneously in the same direction, one pair of said fingers operating to hold the heddle-eye against the wedge-shaped slides while the needle is passing through said eye, and the opposite pair of fingers having inwardly-inclined pointed ends adapted to pass behind the heddle-eye and force the same to the outer ends of the eye-holding jaws and hold it in position during the withdrawal of the wedge-shaped slides, substantially as described.

Witness my hand this 18th day of February, A. D. 1899.

RICHMOND H. INGERSOLL.

In presence of—
P. E. TESCHEMACHER,
M. B. WILSON.